United States Patent [19]

Borth

[11] Patent Number: 5,144,644
[45] Date of Patent: Sep. 1, 1992

[54] SOFT TRELLIS DECODING
[75] Inventor: David E. Borth, Palatine, Ill.
[73] Assignee: Motorola, Inc., Schaumburg, Ill.
[21] Appl. No.: 442,971
[22] Filed: Nov. 29, 1989

Related U.S. Application Data

[63] Continuation-in-part of Ser. No. 422,177, Oct. 13, 1989.
[51] Int. Cl.[5] .......................................... H04L 1/00
[52] U.S. Cl. ...................................... 375/96; 371/43; 375/101
[58] Field of Search ........................ 371/43, 46, 44, 45; 375/14, 18, 34, 58, 96, 99, 100, 103, 94, 101; 364/724.11

[56] References Cited

U.S. PATENT DOCUMENTS

| | | | |
|---|---|---|---|
| 3,875,333 | 4/1975 | Nakano et al. | 375/101 |
| 4,163,209 | 7/1979 | McRae | 375/101 |
| 4,578,800 | 3/1986 | Yasuda et al. | 371/46 |
| 4,583,236 | 4/1986 | Kromer et al. | 371/46 |
| 4,631,735 | 12/1986 | Qureshi | 371/43 |
| 4,641,327 | 2/1987 | Wei | 371/43 |
| 4,701,936 | 10/1987 | Clark et al. | 375/14 |
| 4,748,626 | 5/1988 | Wong | 371/30 |
| 4,829,543 | 5/1989 | Borth et al. | 375/83 |
| 4,852,090 | 7/1989 | Borth | 370/104 |

OTHER PUBLICATIONS

Tadashi Matsumoto, "Soft Decision Decoding of Block Codes Using Received Signal Envelope in Digital Mobile Radio", *IEEE Journal on Selected Areas in Communications*, vol. 7, No. 1, Jan. 1989, pp. 107-113.

Ekemark et al., "Modulation and Channel Coding in Digital Mobile Telephony", *Nordic Seminar on Digital Land Mobile Radiocommunication*, Espoo, Finland, Feb. 5-7, 1985, pp. 219-227.

Gottfried Ungerboeck, "Adaptive Maximum-Likelihood Receiver for Carrier-Modulated Data-Transmission Systems", *IEEE Transactions on Communications*, vol. COM-22, No. 5, May 1974, pp. 624-636.

D'Avella et al., "An Adaptive MLSE Receiver for TDMA Digital Mobile Radio", *IEEE Journal on Selected Areas in Communications*, vol. 7, No. 1, Jan. 1989, pp. 122-129.

*Primary Examiner*—Benedict V. Safourek
*Attorney, Agent, or Firm*—F. John Motsinger

[57] ABSTRACT

There is provided a mechanism for soft trellis decoding. It comprises: generating decisions that rely upon other decision making and associating with it information indicative of the confidence held in those decisions and generated from the relative merit of any given decision. It further comprises: generating Maximum Likelihood Sequence Estimation equalization decisions and multiplying a signed value of the generated decision by the absolute values of the difference between alternative criterion utilized to arrive at any given decision, whereby the relative merit comprises a measure of signal quality at the time that given decision is made.

11 Claims, 2 Drawing Sheets

16-STATE TRELLIS EMPLOYED IN MLSE

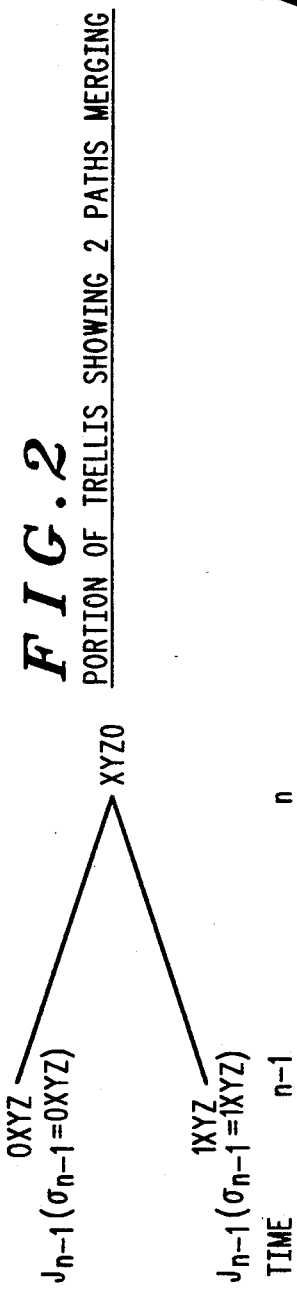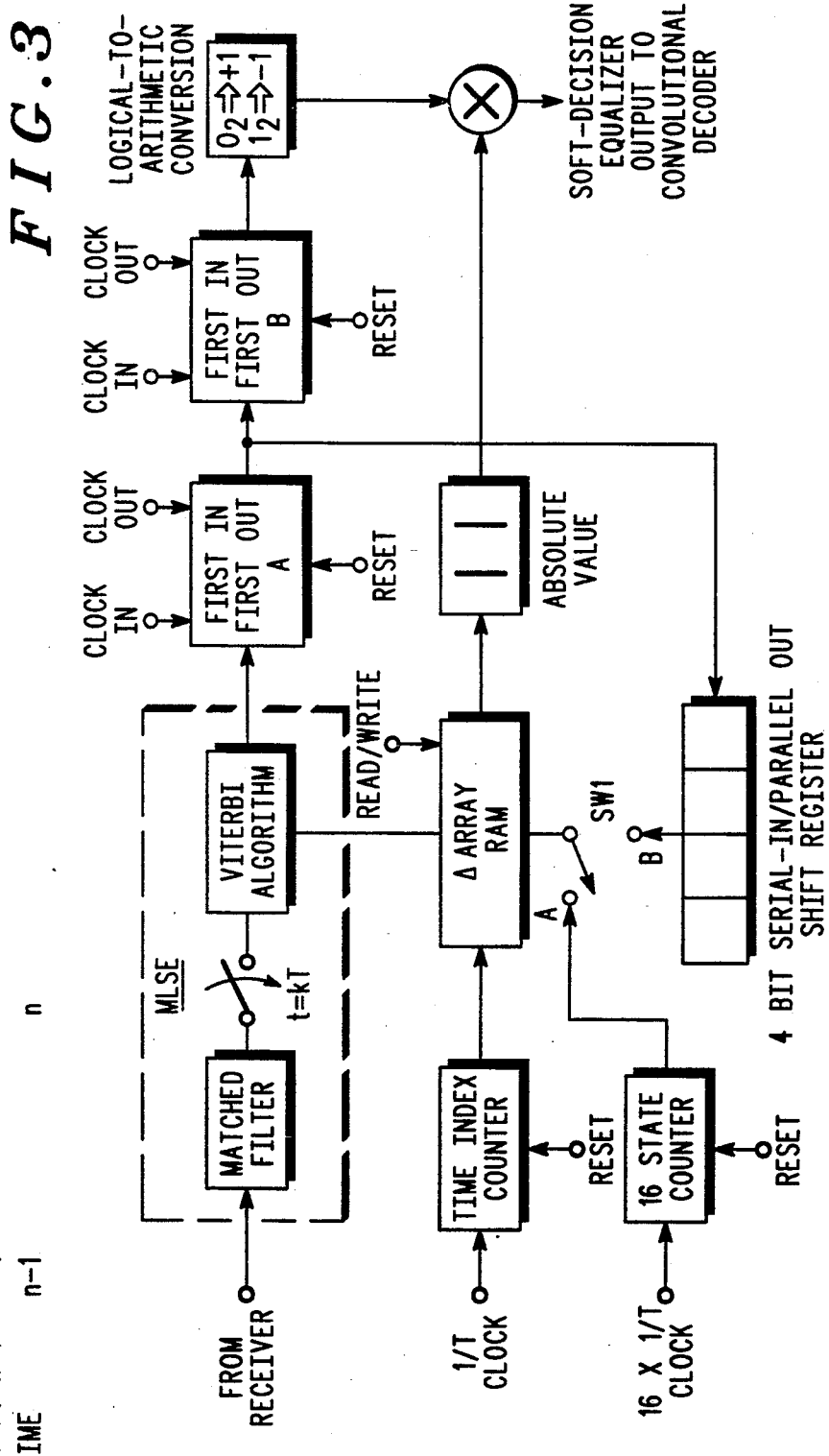

SOFT TRELLIS DECODING

RELATED APPLICATIONS

This is a continuation-in-part application of copending original application (CE02049R) of Borth, Labedz, and Rasky filed Oct. 13, 1989 U.S. Ser. No. 422,177 and assigned to the instant assignee from which priority is claimed.

THE FIELD OF INVENTION

This invention is concerned with soft decision in trellis decoding.

More particularly, this invention is concerned with soft decision making with a Maximum Likelihood Sequence Estimator (MLSE).

BACKGROUND OF THE INVENTION

This invention is particularly concerned with deciding at a receiver which of a predetermined set of symbols was transmitted, by using an error correction or detection decoder operating on a recovered signal having a number of possible values greater than the number of symbols in the set—called soft decision decoding. More particularly, in a communications network having time-dispersed signals, this invention is concerned with soft decision decoding using information derived during equalization.

In digital transmission over a medium vulnerable to corruption, such as a fading radio channel, convolutional error correction coding is used to distribute transmitted information over time such that it can still be reconstructed, despite some corruption. An error correction decoding technique, such as Viterbi algorithm channel decoding, is used to reconstruct the originally-transmitted information from the corrupted signal.

In a digital radiotelephone system, high data rate digital radio transmissions encounter serious intersymbol interference (ISI) due to multiple reflections and echoes off buildings and other objects in the transmission path. The ISI is especially severe in severely delay-spread channels where the various reflections arrive at the receiver delayed by amounts comparable to a significant fraction of a symbol time. Thus, adaptive equalization—attempting to account for these multipath, time-dispersal effects on the signal and realign the echoes in time—is employed prior to error correction or detection. The problem is that equalization attempts to distill the information carried in the composite, multipath signal to a definitive decision about each symbol received—a "hard decision". For example, in the binary case, where one of only two symbols can be sent, the output of the equalizer can only take on one of two values, these values being referred to as the equalizer's hard decisions.

It is well recognized that better decisions can be made about the value of any individually-transmitted symbol with the availability of "soft information". That is, if during error correction, it were known to the decoder what the quality of the signal was when the symbol was received, a better decision could ultimately be made about what the true value of the transmitted symbol really was. This soft information represents a measure of the confidence held in any given symbol detection. But any such soft information has ordinarily been removed by equalization.

Conventional wisdom dictates that soft information be developed at or ahead of the radio demodulator (at the RF, IF or discriminator stage), at a point that is rich in signal quality information (signal strength, noise and distortion). See, for example, FIG. 6 of Tadashi Matsumoto, "Soft Decision Decoding of Block Codes Using Received Signal Envelope in Digital Mobile Radio", *IEEE Journal on Selected Areas in Comm.*, Vol. 7, No. 1, January 1989, or "Modulation and Channel Coding in Digital Mobile Radio Telephony", *Proceedings of the Nordic Seminar on Digital Land Mobile Radiocommunication*, Espoo, Finland, Feb. 5–7, 1985, pp. 219–227. Yet it is not widely recognized that the composite signal envelope yields erroneous information in the severely delay-spread channel. This may possibly be due to the phenomenon of individual signal paths causing rapid signal envelope changes (hereinafter coined "microfading"), changes taking place much more rapidly than is known for conventional Rayleigh fading at a given receiver speed.

This invention takes as its object to overcome these shortcomings. In the copending application referenced above, we recognized that performance superior to that achieved by using the output of the matched filter might be achieved by using the MLSE branch metrics. This invention also takes as its object to realize that advantage and further exploit the operating features of the MLSE.

SUMMARY OF THE INVENTION

There is provided a mechanism for soft trellis decoding. It comprises: generating decisions that rely upon other decision making and associating with it information indicative of the confidence held in those decisions and generated from the relative merit of any given decision. It further comprises: generating MLSE equalization decisions and multiplying a signed value of the generated decision by the absolute values of the difference between alternative criterion utilized to arrive at any given decision, whereby the relative merit comprises a measure of signal quality at the time that given decision is made.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which:

FIG. 2 is a state diagram of two merging branches in the decoder trellis in an MLSE on which the preferred embodiment of the invention operates.

FIG. 3 is a block diagram of the receiver that operates according to the preferred embodiment of the invention.

DETAILED DESCRIPTION

Figure 1:
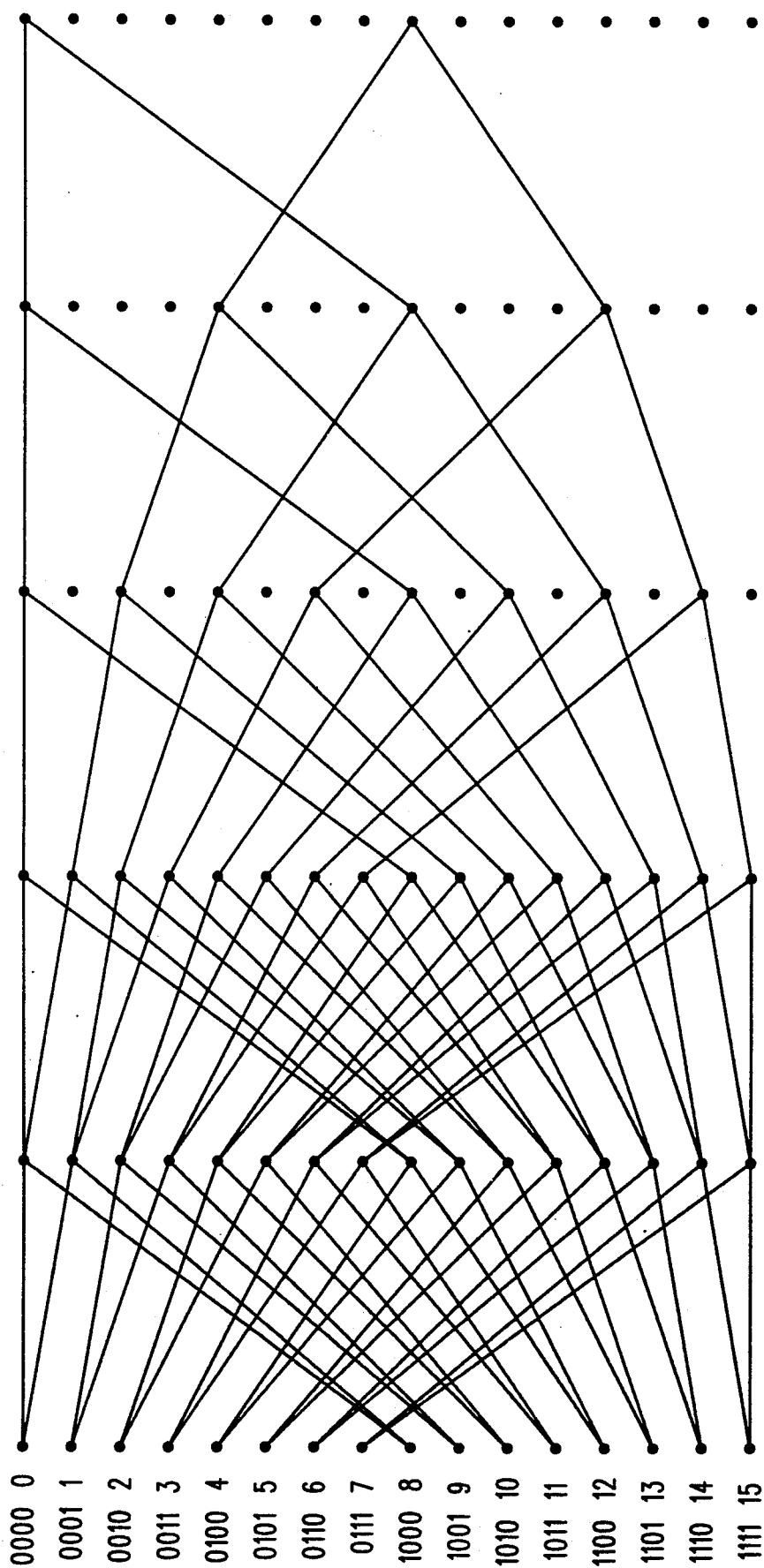
FIG. 1 is a state diagram of 16-state decode trellis in an MLSE on which the preferred embodiment of the invention operates.

Throughout the following description, the notation employed is identical to that employed in the paper G. Ungerboeck, "Adaptive Maximum-Likelihood Receiver for Carrier-Modulated Data-Transmission Systems," *IEEE Transactions on Communications*, vol. COM-22, pp. 624–636, May 1974. Furthermore, all examples given will be for the GSM Pan-European digital cellular radiotelephone system which employs differentially-decoded binary $B_bT=0.3$ GMSK as the modulation technique. In addition, a 16-state MLSE equalizer is assumed to be employed.

From Ungerboeck, eq. (31)–(32), the MLSE (Viterbi) algorithm finds the maximum-likelihood sequence that was transmitted over an intersymbol interference (ISI) channel by optimizing the survivor metric $J_n(\sigma_n)$ for each state $\sigma_n$ for each time instant n via the operation $$J_n(\sigma_n) = 2Re(a_n^* z_n) + \max\{J_{n-1}(\sigma_{n-1}) - F(\sigma_{n-1}, \sigma_n)\} \quad (1)$$

$$\{\sigma_{n-1}\} \to \sigma_n$$

where the maximum is taken over the set of all states $\{\sigma_{n-1}\}$ at time n−1 that have $\sigma_n$ as a possible successor state and $$F(\sigma_{n-1}, \sigma_n) = a_n^* s_0 a_n + 2Re(a_n^* \sum_{l=1}^{L} s_l a_{n-l}) \quad (2)$$

In the above two equations, $$s_i, \ 0 \leq i \leq L$$

is a function of the channel impulse response, $a_{n-1}$ is the (hypothesized) transmitted data symbol at time t=n, $z_n$ is the output of the MLSE at time t=nT, and L is the memory of the ISI channel. Each given bit decision made according to equations 1 and 2 represent decision making which is dependent on the relationship of that given bit decision to preceeding and subsequent bit decisions.

Following Ungerboeck eq. (30), the state $s_n$ is defined as the data sequence $$\sigma_n = a_{n-L+1}, a_{n-L+2}, \ldots, a_n.$$

Note that there exists a one-to-one mapping between the sequences of states ..., $\sigma_{n-1}, \sigma_n, \sigma_{n+1}$, ... and the data sequences ... $a_{n-L}, a_{n-L+1}, \ldots, a_n \ldots$ . This observation will be used below in converting between the sequence of states traversed by the MLSE algorithm and the corresponding maximum likelihood data sequence (and vice-versa).

For the GSM system described above, $a_n$ takes on the values $\{\pm 1 \text{ or } \pm j\}$ (where $j = \sqrt{-1}$), L=4 and equations (1) and (2) become, respectively $$J_n(\sigma_n) = Re(a_n^* z_n) + \max\{J_{n-1}(\sigma_{n-1}) - F(\sigma_{n-1}, \sigma_n)\} \quad (3)$$

$$\{\sigma_{n-1}\} \to \sigma_n$$

$$F(\sigma_{n-1}, \sigma_n) = a_n \{a_{n-1} sI_1 - a_{n-2} sR_2 - a_{n-3} sI_3 + a_{n-4} sR_4\} \quad (4)$$

where $$sI_n = Imag\{s_n\}$$

and $$sR_n = Re\{s_n\}.$$

Letting 0 denote +1 or +j and letting 1 denote −1 or −j, then each state $\sigma_n$ can be written as a binary 4-tuple $$\sigma_n = u_{n-3} u_{n-2} u_{n-1} u_n$$

where $u_i = 0$ or 1 depending upon the value of $a_i$.

Then the maximization process in (3) over the set of all possible sequences $\sigma_{n-1}$ at time n−1 leading up to the state $\sigma_n$ at time n is just the two states $\sigma_{n-1} = u_{n-4} u_{n-3} u_{n-2} u_{n-1}$ which differ in the most significant bit $u_{n-4}$, i.e., the set $\{\sigma_{n-1}\} \to \sigma_n$ is over the two states $\sigma_{n-1} = 0XYZ$ or $\sigma_{n-1} = 1XYZ$ which lead up to the state $\sigma_n = XYZW$ where W, X, Y, and Z take on the values 0 or 1.

Based upon the above observations, the nature of the maximization process implicit in (3) leads to the well-known Viterbi Algorithm (VA) and a description of the maximization process in terms of a trellis diagram.

FIG. 1 is a state diagram of 16-state decode trellis in an MLSE on which the preferred embodiment of the invention operates.

FIG. 1 shows a portion of such a trellis diagram for a 16-state equalizer. States are shown along the ordinate axis in terms of both binary and decimal representation while time is shown along the abscissa.

FIG. 2 is a state diagram of two merging branches in the decoder trellis in an MLSE on which the preferred embodiment of the invention operates.

FIG. 2 shows a segment of the trellis diagram in which the two states at time n−1 which have branches leading up to state $\sigma_n = XYZ0$ at time n are shown. The survivor metric at time n leading to state $\sigma_n = XYZ0$ is the path that maximizes $$\max \{J_{n-1}(\sigma_{n-1}) - F(\sigma_{n-1}, \sigma_n)\}$$

$$\{\sigma_{n-1}\} \to \sigma_n$$

where $\{\sigma_n\} = \{0XYZ \text{ or } 1XYZ\}$ and $\sigma_n = XYZ0$.

Let $A_n = J_{n-1}(\sigma_{n-1} = 0XYZ) - F(\sigma_{n-1} = 0XYZ, \sigma_n = XYZ0)$ and let $B_n = J_{n-1}(\sigma_{n-1} = 1XYZ) - F(\sigma_{n-1} = 1XYZ, \sigma_n = XYZ0)$, representing alternative decision criterion.

Then the upper or lower branch is selected as the survivor path depending upon the sign of the difference $$\Delta_n = A_n - B_n.$$

For example, if $\Delta_n > 0$, the path from $\sigma_{n-1} = 0XYZ$ is selected; otherwise the path from $\sigma_{n-1} = 1XYZ$ is selected. The absolute value of the difference $\Delta_n$ is a measure of how different the two alternatives of subsequences 0XYZ or 1XYZ are and $\Delta_n$ is the measure of the relative merit between the alternatives. Hence if $|\Delta_n|$ is small, then there is a high probability that the signal was noisy and that the bit tentatively decided upon at time n (bit $a_{n-4}$) may be in error. Note that $|\Delta_n|$ accounts for both (1) signal level variations in $a_{n-4}$ through the dependence of $\Delta_n$ on the matched filter outputs $z_{n-4}, z_{n-3}, z_{n-2}, z_{n-1}$ (see eq. (3)); and (2) intersymbol effects on $a_{n-4}$ through the dependence of $\Delta_n$ on $a_{n-3}, a_{n-2}, a_{n-1}$, and $a_n$ (see eq. (4)); i.e., $|\Delta_n|$ is a measure of the equalized symbol's signal quality at the time that given decision is made.

In practice, the tentative decisions at time n are never directly employed as the MLSE equalizer hard decision outputs. This is due to:

(1) at each instant of time n there are 16 (possibly contradictory) tentative decisions being made on bit $a_{n-4}$; and (2) since the MLSE equalizer is a sequence estimator, it is preferable to delay the decisions on symbols as long as necessary so that incorrect decisions based on preliminary data may be avoided.

The new soft-decision algorithm therefore uses both the lagged-decision (hard decision) MLSE outputs as well as the soft-decision information contained in the difference quantity $|\Delta_n|$. The hard decision data values are used to both index the difference values $|\Delta_n|$ and to provide a sign to the soft decision values.

FIG. 3 is a block diagram of the receiver that operates according to the preferred embodiment of the invention.

FIG. 3 illustrates, coupled in series, means for generating decisions that rely upon other decision making and means for associating with it information indicative of the confidence held in those decisions and generated from the relative merit of any given decision.

A block diagram of the invention is shown in FIG. 3 for a 116 bit block length burst, 16 state MLSE equalizer.

The invention has 2 operating modes: Mode A—equalization, and Mode B—soft-decision information association.

In Mode A, all counters and FIFOs are reset initially, switch SW1 is in the A position, RAM Read/Write (R/W) is set to write, FIFO A clock-in is enabled and all other FIFO clocks are disabled. A received data burst consisting of 116 bits (plus an appropriate number of equalizer tail bits) is applied to the MLSE equalizer, 1 bit at a time in a serial fashion. As each bit is clocked in, the time index counter increments by 1 providing a 7 bit ($\log_2 128$) address word to the RAM. In the VA section of the MLSE equalizer, the difference value $\Delta_{in}$ is calculated for each of the 16 states i at time n. As each value is calculated, it is recored in RAM at the concatenated address time index counter value*16-state counter value and the 16-state counter is then incremented. Hence the 16-state counter is incremented at a rate of 16×the bit rate. The generated decision output of the VA section of the equalizer is clocked into the output of FIFO A one equalized bit per bit time.

Following the receipt of 116 received bits by FIFO A, the invention converts to operating Mode B.

In operating Mode B, clock-in of FIFO A is disabled, the time index counter is reset, switch SW1 is set to position B, RAM R/W is set to Read, clock-out of FIFO A and clock-in of FIFO B are enabled, and clock-out of FIFO B is disabled. As each bit is clocked out of FIFO A, it is clocked into FIFO B and also into the 4-bit serial-in/parallel-out shift register. As each bit is clocked out of FIFO A, the time index counter is incremented by 1. The data address supplied to the RAM is now the concatenated address time index counter value*4-bit shift register value.

From the one-to-one mapping between state sequences and data sequences noted above, the 4-bit shift register contents correspond to the actual state value traversed at that instant in time. For example, if the MLSE hard decision bit stream generated was

001001100 . . .

then, after initially clocking in the first 4 data bits, the successive content of the 4-bit shift register would be 0010 (state 2), 0100 (state 4), 1001 (state 9), 0011 (state 3), etc. Thus the address supplied to the RAM performs a table look-up to retreive the associated value of $\Delta_{in}$ at time t=n, i.e., the soft-decision value associated with the bit $a_{n-4}$ at time t=n−4.

The absolute value of $\Delta_{in}$ is then computed and applied to one input of the multiplier.

After 4 bits have been shifted into FIFO B, the clock out of FIFO B is enabled. Bits shifted out of FIFO B are translated from a logical (0,1) format to a signed-arithmetic ($\pm 1$) format and applied to the other input of the multiplier. The multiplier output for bit n is then the soft-decision input to the VA convolutional decoder and the association therebetween is given by MLSE hard decision output at time n·$|\Delta_{in+4}|$ where i is the state traversed by the MLSE at time t=n+4.

Accordingly, what has been accomplished is soft trellis decoding arrived at by generating decisions that rely upon other decision making and associating with it information indicative of the confidence held in those decisions and generated from the relative merit of any given decision.

The attendant advantages of this invention include superior performance of the convolutional decoder when operating in conjunction with the MLSE equalizer. This in turn permits the use of lower cost components in the front end of the receiver and/or the use of lower power at the transmitter.

Thus, there has been provided a mechanism for soft trellis decoding. It comprises: generating decisions that rely upon other decision making and associating with it information indicative of the confidence held in those decisions and generated from the relative merit of any given decision. It further comprises: generating MLSE equalization decisions and multiplying a signed value of the generated decision by the absolute values of the difference between alternative criterion utilized to arrive at any given decision, whereby the relative merit comprises a measure of signal quality at the time that given decision is made.

While the preferred embodiment of the invention has been described and shown, it will be appreciated by those skilled in this field that other variations and modifications of this invention may be implemented. For example, this mechanism could be utilized in a convolutional decoder implemented using the Viterbi algorithm to indicate the confidence held in the decisions generated by the decoder.

These and all other variations and adaptations are expected to fall within the ambit of the appended claims.

What we claim and desire to secure by Letters Patent is:

1. A method of soft trellis decoding comprising:
   determining the probable present state from sequences of probable prior states and relative measures of merit related to the transitions from the last previous probable states to the probable present state
   associating with the present state that measure of relative merit
   and decoding the information represented by that more probable sequence of states utilizing the measure of merit associated with each state.

2. A method as claimed in claim 1 above, wherein such probable states are generated from Maximum-Likelihood Sequence Estimation equalizers.

3. A method as claimed in claim 1 above, wherein such probable states are generated from Viterbi algorithm equalizers.

4. A method as claimed in claim 1 above, wherein such decoding is generated from convolutional decoders.

5. A method as claimed in claim 1 above, wherein association comprises multiplying the value representative of the determined state by the measure of relative merit for that state.

6. A method as claimed in claim 5 above, wherein multiplication comprises multiplying a signed value representative of the determined state by the absolute value of the difference between alternative transition sequences.

7. A method as claimed in claim 1 above, wherein association comprises multiplying the value representative of the determined state by the absolute value of that measure of relative merit in the difference between alternative transition sequences.

8. A method as claimed in claim 1 above, wherein the relative merit comprises a measure of signal quality at the time that the present state is determined.

9. A method as claimed in claim 1 above, wherein the relative merit comprises the difference between alternative transition sequences.

10. Apparatus for soft trellis decoding comprising, operatively coupled in series:
means for determining the probable present state from sequences of probable prior states and relative measures of merit related to the transitions from the last previous probable states to the probable present state,
means for associating with the present state that measure of relative merit
and means for decoding the information represented by that more probable sequence of states utilizing the measure of merit associated with each state.

11. Apparatus for soft trellis decoding comprising, operatively coupled in series:
means for determining the probable present state from sequences of probable prior states and relative measures of merit related to the transitions from the last previous probable states to the probable present state,
means for multiplying the value representative of the determined state by the absolute value of that measure of relative merit in the difference between alternative transition sequences
and means for decoding the information represented by that more probable sequence of states utilizing the measure of merit weighted with each state.

* * * * *